United States Patent [19]

Browne

[11] Patent Number: 4,973,609
[45] Date of Patent: Nov. 27, 1990

[54] POROUS FLUOROPOLYMER ALLOY AND PROCESS OF MANUFACTURE

[75] Inventor: Ronnie Browne, Derry, N.H.

[73] Assignee: Memron, Inc., Amherst, N.H.

[21] Appl. No.: 272,549

[22] Filed: Nov. 17, 1988

[51] Int. Cl.$^5$ .............................................. C08J 9/24
[52] U.S. Cl. ...................................... 521/81; 521/134; 521/145
[58] Field of Search ........................ 521/134, 145, 81; 525/198, 199, 200; 428/306.6, 308.4, 309.9, 36, 222, 421, 422; 264/46.1, 210.7

[56] References Cited

U.S. PATENT DOCUMENTS

| | | | |
|---|---|---|---|
| 3,484,503 | 12/1969 | Magner et al. | 525/199 |
| 3,764,363 | 10/1973 | Civardi et al. | 117/10 |
| 3,933,653 | 1/1976 | Hashino et al. | 210/500 M |
| 3,936,335 | 2/1976 | Martuch | 156/79 |
| 3,953,566 | 4/1976 | Gore | 264/288 |
| 3,962,153 | 6/1976 | Gore | 260/2.5 |
| 4,025,679 | 5/1977 | Denny | 428/91 |
| 4,031,283 | 6/1977 | Fagen | 428/280 |
| 4,049,589 | 9/1977 | Sakane | 260/2.5 |
| 4,061,134 | 12/1977 | Samuels et al. | 128/1 R |
| 4,082,893 | 4/1978 | Okita | 428/376 |
| 4,096,227 | 6/1978 | Gore | 264/210 |
| 4,110,392 | 8/1978 | Yamazaki | 264/127 |
| 4,116,892 | 9/1978 | Schwarz | 521/62 |
| 4,177,334 | 12/1979 | Okita | 521/145 |
| 4,193,138 | 3/1980 | Okita | 3/1.4 |
| 4,208,745 | 6/1980 | Okita | 3/1.4 |
| 4,209,480 | 6/1980 | Homsy | 264/108 |
| 4,217,399 | 8/1980 | Dobo | 428/679 |
| 4,225,547 | 9/1980 | Okita | 264/127 |
| 4,248,924 | 2/1981 | Okita | 428/212 |
| 4,250,138 | 2/1981 | Okita | 264/568 |
| 4,277,429 | 7/1981 | Okita | 264/127 |
| 4,283,448 | 8/1981 | Bowman | 428/36 |
| 4,304,010 | 12/1981 | Mano | 3/1.4 |
| 4,332,035 | 6/1982 | Mano | 3/1.4 |
| 4,473,617 | 9/1984 | van Leeuwen et al. | 428/373 |
| 4,482,516 | 11/1984 | Bowman et al. | 264/127 |
| 4,546,043 | 10/1985 | Yoshimoto et al. | 428/397 |
| 4,584,240 | 4/1986 | Herbert et al. | 428/373 |
| 4,596,837 | 6/1986 | Yamamoto et al. | 521/145 |
| 4,598,011 | 7/1986 | Bowman | 428/221 |
| 4,629,650 | 12/1986 | Kataoka | 428/213 |
| 4,650,815 | 3/1987 | Namba | 521/77 |
| 4,716,073 | 12/1987 | Randa | 428/215 |
| 4,737,526 | 4/1988 | Mukaiyama et al. | 521/145 |
| 4,742,085 | 5/1988 | Cozens | 521/56 |

FOREIGN PATENT DOCUMENTS 62-201943  9/1987  Japan .

Primary Examiner—Veronica P. Hoke
Attorney, Agent, or Firm—Weingarten, Schurgin, Gagnebin & Hayes

[57] ABSTRACT

A porous fluoropolymer alloy material and method of fabrication is provided. The alloy material is fabricated by forming a compressed extrusion billet from two or more fluoropolymer resins capable of being stretched after extrusion and having different stretch characteristics. The fluoropolymer alloy billet is then extruded, stretched and sintered. The resulting material has a microstructure of large nodes interconnected by fibrils all oriented in the direction of stretch and has a higher tensile strength than produceable from previous porous fluoropolymer materials. Also, the resulting material can be made at lower stretch rates and at higher stretch ratios than previously possible without degradation of the material's strength. In one embodiment the resulting product is a self-supporting, tunable asymmetric porous fluoropolymer alloy material having a microstructure comprised of relatively small nodes, short fibrils and small pore size on one surface and relatively large nodes, long fibrils and large pore size on the opposite surface. The microstructure of the material gradually changes from the microstructure of the one surface to the microstructure of the opposite surface through the cross-section of the material's thickness, and all of the fibrils throughout the material are oriented in the direction of stretch.

24 Claims, 7 Drawing Sheets

POROUS FLUOROPOLYMER ALLOY AND PROCESS OF MANUFACTURE

FIELD OF THE INVENTION

This invention relates to porous fluoropolymer materials, and in particular to porous fluoropolymer alloy materials and their processes of manufacture.

BACKGROUND OF THE INVENTION

Fluoropolymers are characterized by the fact that they are highly inert, paraffinic thermoplastic polymers that have all or some of all of the hydrogen replaced with fluorine. Fluoropolymers include polytetrafluoroethylene (PTFE), fluorinated ethylene propylene. (FEP), and perfluoroalkoxytetrafluoroethylene (PFA), which are all capable of being extruded, stretched and sintered. Much of the work on development of porous fluoropolymer materials, however, has involved tetrafluoroethylene polymers, and processes for producing porous tetrafluoroethylene polymer materials have been disclosed in many U.S. patents.

Porous tetrafluoroethylene polymer products can be produced by stretching an extruded sample of a highly crystalline tetrafluoroethylene polymer resin and then sintering the extrudate while holding it in the stretched state. A dispersion of a tetrafluoroethylene polymer is paste-formed, mixed with a lubricant and extruded. The lubricant is then removed and the resulting extrudate is stretched at a high rate, usually at an elevated temperature less than the crystalline melting point of the tetrafluoroethylene polymer resin. While being held in the stretched state, the tetrafluoroethylene extrudate is sintered by then heating the stretched extrudate above the crystalline melting point. This process produces a material having a microstructure comprising of nodes interconnected by very small fibrils. This microstructure greatly increases the tensile strength of the tetrafluoroethylene polymer extrudate. Because of the node and fibril structure, the material is also substantially more porous than the original extrudate.

The temperature and particularly the rate of stretching greatly affect the porosity and tensile strength of the resulting material. Stretching performed at very high rates produces an increase in the strength of the resulting material. When the unsintered extrudate is stretched at lower rates, limited stretching occurs before fracture of the material, and any materials produced from stretching at the lower rates have coarse microstructures and are mechanically weak. Also, extrudates expanded at both high temperatures and high rates have a more homogeneous structure and a greater tensile strength than extrudates expanded at lower temperatures and lower rates. Therefore, high stretch rates are believed necessary to produce strong materials and both high stretch rates and high temperatures have been recommended to achieve high stretch ratios, homogeneous structures and strong materials.

Furthermore, the primary requisite of a suitable tetrafluoroethylene polymer resin for the process described above is a very high degree of crystallinity, preferably in the range of 98% or above, and correspondingly low amorphous content. Copolymers of tetrafluoroethylene which have defects in the crystalline structure that introduce a higher amorphous content do not work well in the process as homopolymers.

The process discussed above does not generally produce PTFE materials having fine pores less than 2,000 A in diameter. The process, however, can be modified to produce a PFTE material having such fine pores by first stretching the extrudate as discussed above, by then "free" sintering the extrudate by heating it above its crystalline melting point without subjecting the extrudate to tension by holding it in its stretched state, and by then stretching the extrudate a second time at a temperature below the crystalline melting point. The second stretching produces a PTFE material having uniform fine pores between 100 to 1500 A in diameter.

PTFE resin tubes having small pore size and also high porosity can be produced by drawing a tubular PTFE extrudate in the lengthwise direction through a metal die and plug to perform the stretching operation. The thickness of the tube can be reduced to a level not previously possible by radially expanding the tube while simultaneously performing the sintering operation.

The key element of the processes described above is taught to be rapid stretching of the tetrafluoroethylene polymer extrudate. Rapid stretching allows the unsintered extrudate to be stretched much farther than had previously been possible, while at the same time making the resulting tetrafluorethylene material stronger. The rapid stretching also produces a microstructure which is very fine, for example, having a very small effective pore size. When the unsintered extrudate is stretched at a slower rate, either limited stretching occurs because the material breaks, or a weak material is obtained. This weak material has a microstructure that is coarser than materials that are stretched equivalent amounts but at faster rates of stretch.

Densification of an unsintered PTFE extrudate after removal of the lubricant and prior to stretching produces a coarse, highly porous, yet strong, PTFE material which has a microstructure of relatively large nodes interconnected by relatively long fibrils. The desensification step does not change the qualitative interaction of rate of stretch and temperature during stretching that is described above. It merely allows production of coarser articles as compared to prior art articles of comparable strength. Densification can be performed through use of presses, dies or calendering machines.

A water-soluble polymer can be added to a PTFE material after sintering to fill the pore spaces of the material. Also, tearing of porous PTFE tubing in the axial direction can be reduced by coating the tubing with a porous elastomer after sintering the tubing. These processes, however, merely combine a fabricated PTFE material with a non-fluoropolymer material.

Asymmetric porous fluoropolymer materials are defined as porous fluoropolymer materials which have a microstructure that changes in some way from one surface to another. Typically, such asymmetrical materials have a porosity that increases or decreases through the cross-section of the material from one surface to another. One kind of asymmetric PTFE tubing can be produced by heating the outside of a stretched tubular extrudate above the crystalline melting point of the extrudate during the sintering operation while simultaneously heating the inside of the tube to a lower temperature. An asymmetric porous PTFE film can be produced by performing the stretching operation by expanding the film on a pair of rolls having different angular velocities wherein the high speed roll is heated to a temperature higher than the temperature of the low speed roll.

The porous tetrafluoroethylene polymer materials produced by the above-mentioned processes can all be characterized as having microstructures comprised of nodes linked together by fibrils. As discussed above, these nodes and fibrils vary in size depending upon the rate, ratio, and temperature of stretching. The spaces between the nodes and fibrils comprise the pores, and in general, the pore size depends upon the amount the material has been stretched in any one direction. Therefore, as the stretch ratio increases, the length of the fibrils increase and the size of the nodes decrease. Consequently, as the stretch ratio increases, the porosity increases. Furthermore, the materials produced as described above, are all made from an extrudate wholly comprised of only one highly crystalline tetrafluoroethylene polymer resin.

SUMMARY OF THE INVENTION

Fluoropolymer resins capable of being extruded, stretched and sintered, such as resins of PTFE, FEP and PFA, vary in properties such as average particle size, specific gravity, crystallinity, desirable extrusion reduction ratio and sintering rates. These properties affect how extrudates formed from the resins react when heated and stretched to achieve a desired pore size. For example, extrudates of some fluoropolYmer resins capable of being stretched after extrusion must be stretched at higher rates, ratio and/or temperatures than extrudates of other fluoropolymer resins capable of being stretched after extrusion to obtain identical pore sizes in finished materials. This is because particle size and the mechanical bonding between particles of different resins determine the size of the node and fibril microstructure which makes up the pores. Furthermore, different fluoropolymer resins capable of being stretched after extrusion have different limits to which they can be stretched and yet remain strong.

In brief, the present invention is a porous fluoropolymer alloy material and method of fabrication. The material is a unique physical admixture of two or more fluoropolymer resins capable of being extruded, stretched and sintered, and having different stretch characteristics. The material is not a product of chemical bonding, but is an alloy because sites of compatibility along the molecular chains of the resins are established such that a degree of physical cross-linking occurs along the molecular chains. This alloying takes place during compounding under the high shear conditions of extrudation.

One porous fluoropolymer alloy material of the present invention is fabricated by forming a compressed extrusion billet from two or more fluoropolymer resins capable of being extruded, stretched and sintered and having different stretch capabilities. The fluoropolymer alloy billet is then extruded, stretched and sintered.

The resulting material has a microstructure of large nodes interconnected by fibrils oriented in the direction of stretch and has a higher tensile strength than previous porous fluoropolymer materials. Therefore, the resulting alloy material has a higher tenacity than prior porous fluoropolymer materials, which for certain uses require the support of porous elastomer coatings. The resulting alloy material need not be bonded or otherwise attached to a supporting fabric or structure. Also, the alloying of the fluoropolymer resins allows the resulting material to be made at lower stretch rates and higher stretch ratios than previously possible without degradation of the material's mechanical strength.

When the porous fluoropolymer alloy material is fabricated in tubular form, the alloying of the fluoropolymer resins also improves the radial strength of the resulting tubular product over prior fluoropolymer products because the circumferential nodes of the present invention are oriented perpendicular to the direction of stretch. The tubular product's resistance to kinking and compressive loads in all axis is also improved because of the perpendicular orientation of the circumferential nodes.

In an alternative embodiment, the present invention is formed into an asymmetric porous fluoropolymer alloy material. A compressed tubular extrusion billet is formed of a first layer of a fluoropolymer resin which is capable of being highly stretched after extrusion and a second layer of a fluoropolymer resin which is less capable of being stretched. A third intermediate layer of a mixture of the resins of the first and second layers can be disposed between the first and second layers to create sites of compatibility to improve bonding of the first and second layers.

The layered extrusion alloy billet is then extruded, stretched and sintered to produce a resulting material having an asymmetric porous microstructure. The resulting asymmetric porous alloy material has a microstructure comprised of relatively small nodes, short fibrils and small pore size on one surface and relatively large nodes, long fibrils and large pore size on the opposite surface. The fibrils are all oriented in the direction of stretch, and the microstructure of the material gradually changes from the microstructure of the one surface to the microstructure of the opposite surface through the cross section of the material's thickness. Therefore, the nodes and fibrils differ in size across the cross section of the material.

Like the resulting alloy material discussed above, the resulting asymmetric alloy material has a tensile strength and therefore a tenacity higher than previously possible. Therefore, the asymmetric alloy material need not be bonded or otherwise attached to a fabric or other supporting structure. The alloying of the fluoropolymer resins also allows the asymmetric material to be made at lower stretch rates and at higher stretch ratios than previously possible. Furthermore, when fabricated in tubular form, the asymmetric material also has improved radial strength and resistance to kinking.

The asymmetric resulting material, however, has an additional advantage of being elastic and resilient in the direction of fibril orientation. Therefore, when the material is compressed along the direction of fibril orientation by physical force, for example, by pushing along the direction of fibril orientation, the fibrils throughout the material concurrently decrease in length, which thus concurrently decreases the sizes of the pores throughout the material. Therefore, the average pore size of the material can repeatedly be mechanically changed over a range to produce any desired average pore size within the range.

Articles made from the present invention are particularly useful for industrial and medical ultrafiltration. The asymmetric microstructure of the asymmetric porous fluoropolymer alloy resulting material is particularly well suited for use as a combination depth and absolute filter membrane to progressively remove contaminates of a decreasing size. Thus, when used as a filter membrane, the asymmetric resulting material of the present invention would take longer to plug than conventional fluoropolymer membranes, which are not asymmetrical. Furthermore, because the pore sizes throughout the asymmetric resulting material are capable of being physically adjusted over a range by merely compressing the material along the direction of stretch, the present invention is especially suitable for tunable ultrafiltration devices. Therefore, the asymmetric embodiment can be used as a tunable filter membrane which has an average pore size that can be easily adjusted for a desired application by merely mechanically adjusting the dimension of the membrane along its direction of fibril orientation. No prior filter membrane material has this capability.

BRIEF DESCRIPTION OF THE DRAWINGS

The invention will be more fully understood from the following detailed description provided in conjunction with the accompanying drawings, in which.

DETAILED DESCRIPTION OF THE INVENTION

The porous fluoropolymer alloy materials of the present invention are comprised of a physical admixture of two or more fluoropolymer resins capable of being extruded, stretched and sintered and having different stretch characteristics. Examples of such resins are resins of PTFE (whether or not highly crystalline), FEP and PFA. The fluoropolymer resins, which are usually supplied as fine, free-flowing powders, are blended with a hydrocarbon oil lubricant, such as naphtha, ISOPAR[3] G, ISOPAR H, or low odor paraffin solvent. The resins are then preformed by compressing them into an extrusion billet approximately one third of their original volume. Such a preforming operation is well known in the art. The billet is then extruded in a manner well known in the art. The extrusion step compounds the resins under high shear conditions and thus causes alloying to occur by a establishing sites of compatibility along the molecular chains of the resins such that a degree of physical cross-linking occurs the along the molecular chains.

The resulting extrudate is then dried to remove the lubricant and stretched at a temperature below the crystalline melting point of the extrudate. While held in its stretched state, the extrudate is then sintered by heating it to a temperature above its crystalline melting point.

The following examples of products produced in accordance with the present invention illustrate the process and the resulting products in detail.

EXAMPLE I

Blended Porous PTFE Alloy Tube

Two PTFE resins, CD123 and T60, where blended, extruded, expanded and sintered to form a porous fluoropolymer alloy tube. Each resin was first blended in a separate one gallon jar with 18% naphtha as a lubricant. The two lubricated resins were then blended into a 50:50 mixture by weight by rolling in a third jar. The resin mixture was poured into a four inch diameter preforming cylinder and an extrusion billet was formed by slowly compacting the resin mixture to a pressure of 400 psi.

The billet was then transferred to a tubular extruder having a reduction ratio of 442:1. The billet was extruded into a tubular extrudate under an extrusion pressure of 2200 psi, at a speed of two feet per minute and at a die temperature of 85° F. After extrusion, the extrudate was cut into six inch lengths and allowed to air dry. The drying removed the naphtha lubricant from the extrudate. The six inch lengths of tubular extrudate were then further cut into two inch samples.

The two inch samples were allowed to soak for five minutes at 400° F. before being stretched. The samples were stretched at 400° F. at an expansion ratio of 4:1 and an expansion rate of 10% per second to a final sample length of eight inches. The samples were held in their stretched state and allowed to air cool prior to sintering.

The samples were then sintered by heating them to 680° F. for three minutes. Following sintering, the samples were air quenched. The resulting material had a microstructure of large nodes interconnected by fibrils oriented in the direction of stretch. As can be seen in Table 1, contrary to the teachings of prior patents, the porous PTFE material had a "matrix tensile strength" exceeding 7300 psi. Furthermore, the resulting material was produced at a stretch rate slower than thought possible to produce strong, expanded porous PTFE products.

TABLE 1

EXAMPLE I TENSILE TEST DATA

| Sample | Weight | Wall Thickness (in.) | Failure Load (lbs) | "Matrix Tensile Strength" (psi) | Ultimate Tensile Strength (psi) |
|---|---|---|---|---|---|
| 1 | .10685 | .022 | 16.1(7.6 Kg) | 10,780 | 3636 |
| 2 | .11739 | .022 | 18.3(8.3 Kg) | 11,224 | 4159 |
| 3 | .11110 | .022 | 16.5(7.5 Kg) | 10,693 | 3750 |
| 4 | .10854 | .022 | 16.7(7.6 Kg) | 11,076 | 3795 |
| 5 | .11355 | .022 | 16.5(7.5 Kg) | 10,462 | 3750 |
| 6 | .11738 | .022 | 18.5(8.4 Kg) | 11,346 | 4204 |

Notes:
All samples were trimmed to 2 in × 0.2 in. × .022 in before testing.

Ultimate Tensile Strength $= \frac{P}{A} = \frac{\text{Failure Load}}{\text{Cross-sectional area of test sample}}$ "Matrix Tensile Strength" is not an ASTM standard and is only provided to allow comparison to some of the prior PTFE porous products described in the patents discussed above.

"Matrix Tensile Strength" is defined as

Ultimate Tensile Strength $\times \frac{\text{Specific Gravity of PTFE}}{\text{Weight of Test Sample} / \text{Volume of Test Sample}}$

EXAMPLE II

Asymmetric Porous PTFE Alloy Tube

From Example I, it can be seen that alloying PTFE resins can produce an extrudate which when expanded at slow rates produces a stronger PTFE porous material than previously thought possible. An asymmetric porous fluoropolymer alloy material can also be produced in accordance with the present invention. The expansion ratio between T60 and CD123 PTFE resins is in the order of 6:1. By alloying the two resins in layers, a resulting PTFE product having larger nodes, longer fibrils and larger pores on one surface; having smaller nodes, shorter fibrils and smaller pores on the opposite surface and having a gradual change in node size, fibril length and pore size through the cross-section of the material can be produced.

Figure 1:
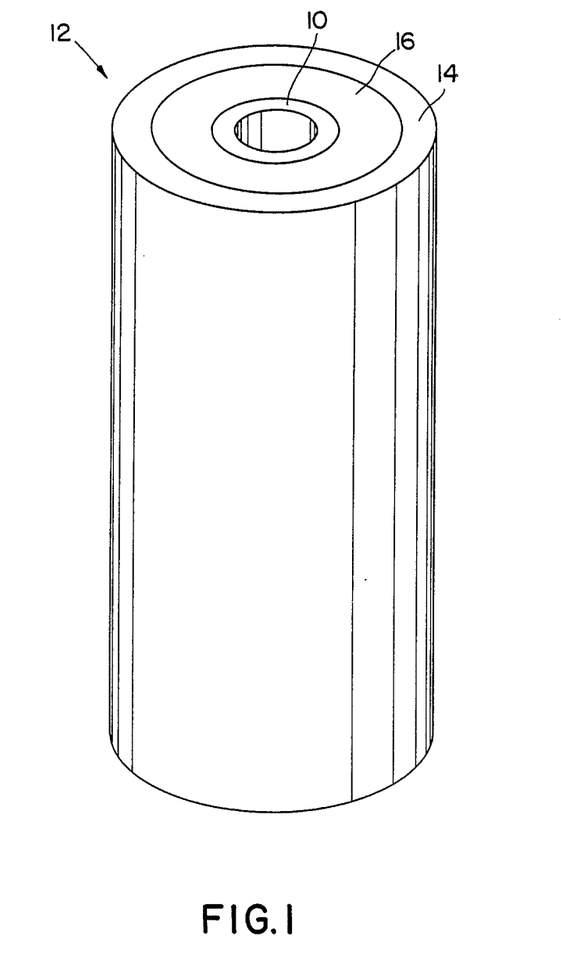
FIG. 1 is a perspective view of a tubular extrusion billet formed during fabrication of an asymmetric porous fluoropolymer alloy tube in accordance with the present invention.

CD123 and T60 PTFE resins were separately blended with 18% naphtha lubricant. A 50:50 mixture of CD123 and T60 PTFE resin was also separately blended with 15% naphtha lubricant. The three blends were then separately poured into a four inch preforming cylinder in concentric layers as shown in FIG. 1. Inner layer 10 of tubular extrusion billet 12 was comprised of CD123, which is capable of being highly stretched. Outer layer 14 of tubular billet 12 was comprised of T60, which is capable of being stretched to a lesser degree than CD123. An intermediate layer 16 separated inner layer 10 and outer layer 14 and was comprised of the 50:50 mixture of the resins. Intermediate layer 16 was employed to form sites of compatibility which assisted the mechanical bonding of the inner and outer layers. Concentric cylinders placed into the preforming cylinder separated the layers during pouring. The cylinders were removed after pouring was completed. An extrusion billet was then formed by compacting the layers under a pressure of 400 psi.

Figure 2:
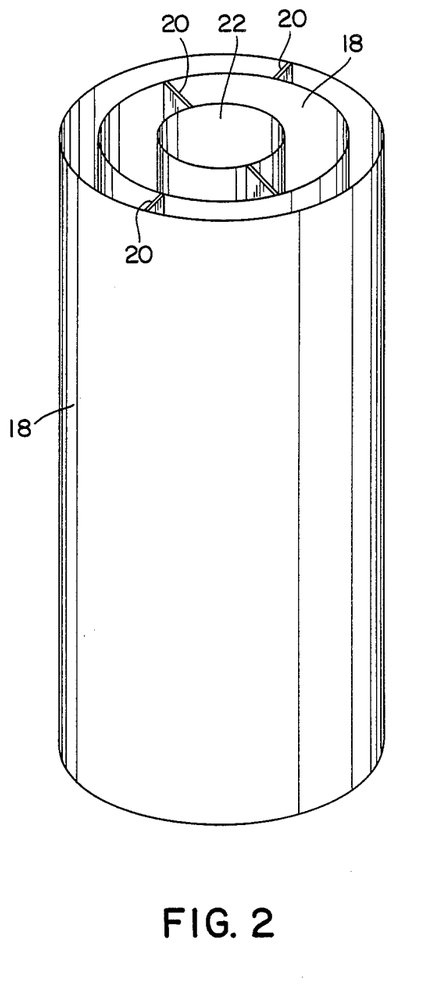
FIG. 2 is a perspective view of a pouring fixture that can be used during fabrication of an asymmetric porous fluoropolymer ally tube in accordance with the present invention.

A one-piece pouring fixture as shown in FIG. 2 can also be employed to separate the layers during pouring. In the fixture, concentric separating cylinders 18 are spaced apart by spacing vanes 20. Core rod cylinder 22 fits over the core rod of the preforming cylinder and aligns the fixture in the preforming cylinder during pouring.

The billet was then transferred to a tubular extruder having a reduction ratio of 374:1. As with Example I, the billet was extruded into a tubular extrudate at 85° F. under a pressure of 2200 psi at a speed of two feet per minute. Two inch samples were cut from the tubular extrudate and allowed to soak at 400° F. for ten minutes prior to stretching. The samples were then stretched at 400° F. for 50 seconds at a rate of 10% per second to a length of twelve inches. The samples were allowed to cool to room temperature before sintering.

Figure 3:
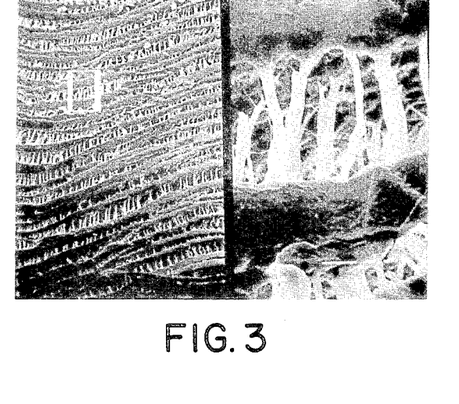
FIG. 3 is a composite photomicrograph taken at 150× and 1000× magnifications of the outside surface of an asymmetric porous fluoropolymer alloy tube of the present invention having relatively large nodes, long fibrils and large pores.
Figure 4:
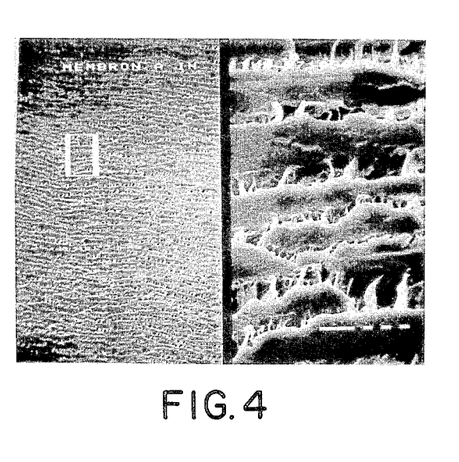
FIG. 4 is a composite photomicrograph taken at 150× and 1000× magnification of the opposite inside surface of the tube of FIG. 3, and having relatively small nodes, short fibrils and small pores.
Figure 5:
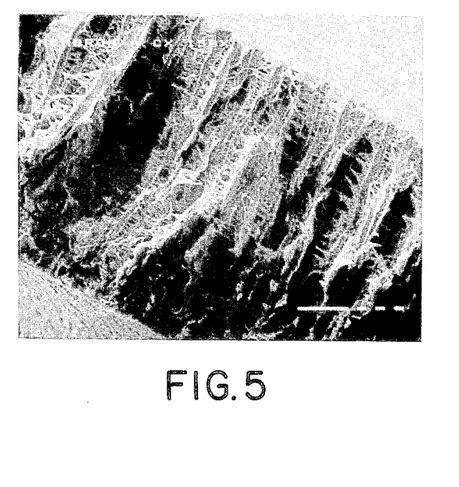
FIG. 5 is a photomicrograph taken at 150× magnification of a cross-section of the wall of the tube of FIGS. 3 and 4.

Sintering was then conducted by heating the samples to a temperature of 680° F. for 5 minutes. After sintering, the samples were allowed to cool to room temperature. As can be seen from FIG. 3, the resulting tubular product had an outside surface with a microstructure comprised of relatively large nodes and long fibrils, which corresponded to a relatively large pore size size. As can be seen from FIG. 4, the resulting tubular product also had an inner surface with a microstructure comprised of relatively small nodes and short fibrils, which corresponded to a relatively small pore size. As can be seen from FIG. 5, the microstructure of the resulting tubular product gradually changed through the cross-section of the wall of the product from the relatively large node, long fibril, large pore microstructure of the surface of FIG. 3 to the relatively small node, short fibril, small pore microstructure of the surface of FIG. 4.

As can be seen in Tables 2A and 2B, the resulting tubular product also had high longitudinal and radial tensile strength. Contrary to the teachings of prior patents, the resulting tubular product had a "matrix tensile strength" exceeding 7300 psi and was produced at a stretch rate slower then thought possible to produce strong, expanded porous PTFE products.

The resulting tubular product of Example II was also elastic and resilient in the direction of fibril orientation. Therefore, when the tubular product was compressed from its relaxed state along the direction of fibril orientation by physical force, for example, by pushing along the direction of fibril orientation, the fibrils throughout the material concurrently decreased in length, which thus concurrently decreased the sizes of the pores throughout the material. Therefore, the average pore size of the material could repeatedly be mechanically changed over a range to produce any desired average pore size within the range.

TABLE 2A

EXAMPLE II LONGITUDINAL TENSILE TEST DATA

| Sample | Weight | Wall Thickness (in.) | Failure Load (lbs) | "Matrix Tensile Strength" (psi) | Ultimate Tensile Strength (psi) |
|---|---|---|---|---|---|
| 1 | .18232 | .025 | 24.9(11.3 Kg) | 10,095 | 4980 |
| 2 | .11248 | .025 | 27.7(12.6 Kg) | 18,203 | 5540 |
| 3 | .13376 | .025 | 27.5(12.5 Kg) | 15,197 | 5500 |
| 4 | .11117 | .025 | 26.9(12.2 Kg) | 17,886 | 5380 |
| 5 | .11943 | .025 | 27.5(12.5 Kg) | 17,021 | 5500 |
| 6 | .12031 | .025 | 27.8(12.6 Kg) | 17,080 | 5560 |

Notes:
All samples were trimmed to 2 in × 0.2 in. × .025 in before testing.

Ultimate Tensile Strength $= \frac{P}{A} = \frac{\text{Failure Load}}{\text{Cross-sectional area of test sample}}$ "Matrix Tensile Strength" is not an ASTM standard and is only provided to allow comparison to some of the prior PTFE porous products described in the patents discussed above.

"Matrix Tensile Strength" is defined as

Ultimate Tensile Strength $\times \frac{\text{Specific Gravity of PTFE}}{\text{Weight of Test Sample} / \text{Volume of Test Sample}}$ To a limited extent, the resulting tubular product could also be expanded by physical force to concurrently increase the sizes of the pores throughout the material. However, over-expansion of the resulting tubular product after sintering caused fibrils to break and reduced the useful life of the material.

TABLE 2B

EXAMPLE II RADIAL TENSILE TEST DATA

| Sample | Weight | Wall Thickness (in.) | Failure Load (lbs) | "Matrix Tensile Strength" (psi) | Ultimate Tensile Strength (psi) |
|---|---|---|---|---|---|
| 1 | .045 | .025 | 14.1(6.4 Kg) | 8350 | 2800 |
| 2 | .048 | .025 | 18.5(8.4 Kg) | 10,344 | 3700 |

Notes:
All samples were trimmed to 2 in × 0.2 in. × .025 in before testing.

Ultimate Tensile Strength $= \frac{P}{A} = \frac{\text{Failure Load}}{\text{Cross-sectional area of test sample}}$ "Matrix Tensile Strength" is not an ASTM standard and is only provided to allow comparison to some of the prior PTFE porous products described in the patents discussed above.

"Matrix Tensile Strength" is defined as

Ultimate Tensile Strength $\times \frac{\text{Specific Gravity of PTFE}}{\text{Weight of Test Sample} \, \text{Volume of Test Sample}}$

EXAMPLE III

Asymmetric Porous PTFE Alloy Tube

Using unstretched four inch samples from the extrudate of Example II, an asymmetric porous PTFE alloy tubular product having a lower average pore size than the resulting tubular product of Example II was made. The unstretched samples of the extrudate from Example II were soaked at 400° F. for 15 minutes prior to being stretched. The samples were then stretched at 400° F. at an expansion ratio of 2:1 at an expansion rate of 10% per second for ten seconds from an initial length of four inches to a final length of eight inches. Once stretching was complete, the samples were allowed to cool to room temperature while being held in the stretched state. The samples were then sintered by heating them to 680° F. for 10 minutes. Because of the increased density of the node and fibril structure of the stretched samples, it was necessary to increase the sintering time. The samples were then air quenched. The resulting tubular product had the microstructure of the resulting tubular product of Example II, with the exception that all of the fibrils throughout the resulting product of Example III were relatively shorter than the corresponding fibrils of the resulting product of Example II. Therefore, the resulting product of Example III had a lower average pore size in a relaxed state than the resulting product of Example II.

Figure 6:
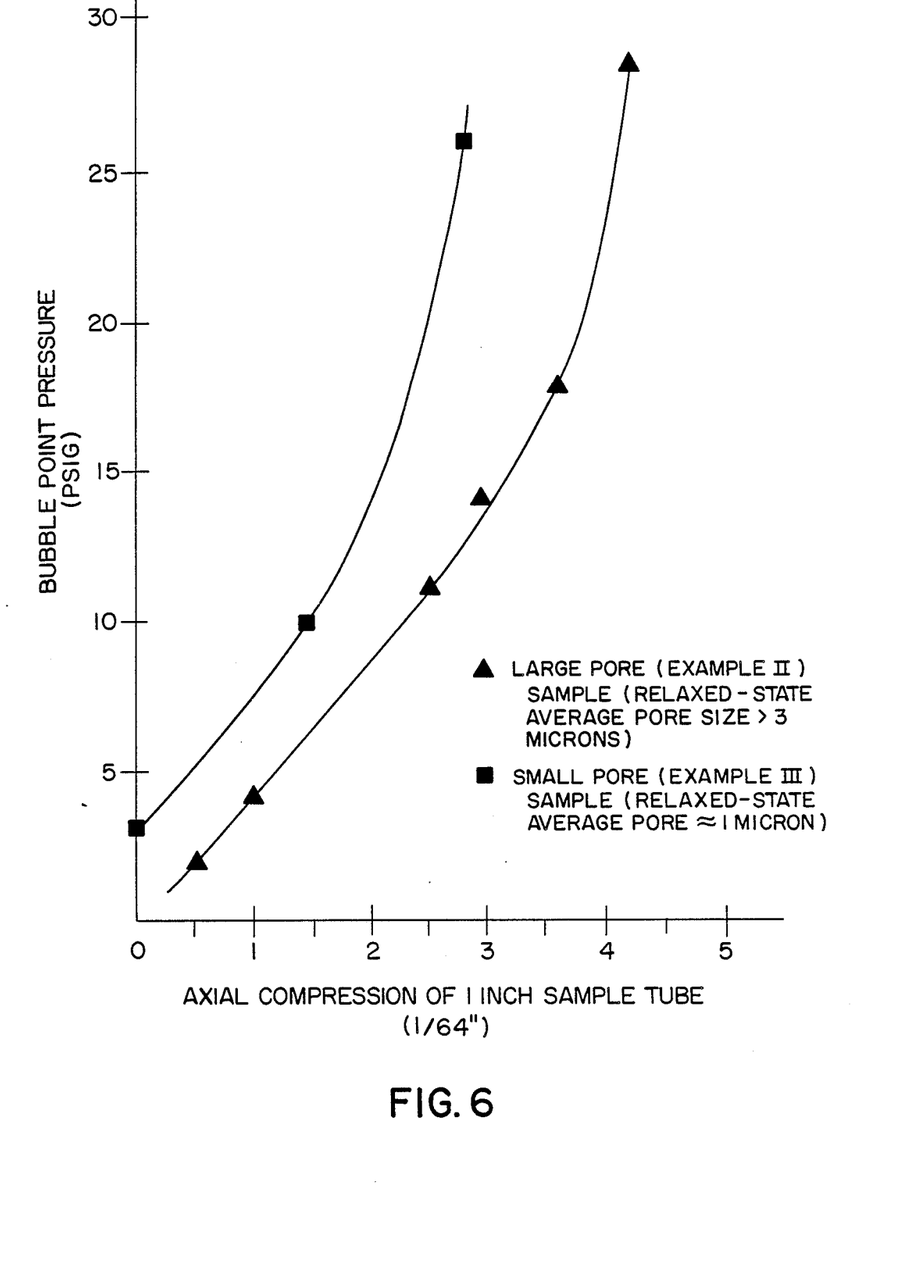
FIG. 6 is a graph of the results of an "ethynol bubble point" test conducted at different axial compressions of one inch samples of two asymmetric porous fluoropolymer alloy tubes of the present invention.

FIG. 6 is a graph that summarizes the results of a well-known "ethynol bubble point" test conducted at different axial compressions of one inch samples of the resulting tubular products of Examples II and III. The graph compares the resulting tubular products and shows that the resulting product of Example III had a lower average pore size in a relaxed state, as measured by bubble point pressure, than the resulting product of Example II. The graph also shows that the average pore sizes of the resulting products of examples II and III, as measured by bubble point pressures, could be adjusted over a range by merely adjusting the amount of axial compression of the resulting tubular products.

EXAMPLE IV

Asymmetric Porous PTFE Alloy Tube

Again, using four inch unstretched samples of the extrudate from Example II, a tubular porous PTFE alloy product having the lowest possible average pore size in a relaxed state was produced.

The four inch unstretched samples from the extrudate of Example II were soaked at 400° F. for fifteen minutes prior to stretching. The samples were then stretched at at 400° F. at an expansion ratio of 1.5:1 for fifteen seconds at a rate of 10% per second to a final length of six inches. Once stretching was completed, the samples were allowed to cool and shrink unrestrained to a relaxed length. This relaxed length was 5.75 inches. The samples were then restrained at the relaxed length and sintered by heating the samples to a temperature of 700° F. for fifteen minutes. After sintering, the samples were water quenched.

The resulting tubular product had the microstructure of the resulting products of Examples II and III, with the exception that the resulting product of Example IV had the The above description is given by way of example. Therefore, it will occur to those skilled in the art that modifications and alternatives to the above-described process and products can be practiced within the spirit of the invention. For example, porous fluoropolymer alloy films can be fabricated in accordance with the present invention. An asymmetric fluoropolymer alloy

TABLE 3

HYDRAULIC PERMEABILITY OF EXAMPLES II, III, AND IV

| Example | Average Pore Size in Relaxed State | State | Pressure (psig) | Flow (ml/min) | Flux (ml/min cm$^2$) |
|---|---|---|---|---|---|
| II | 3 microns | Relaxed | 10 | 400 | 70 |
| III | 1 micron | Relaxed | 10 | 80 | 28 |
|  |  | Relaxed | 5 | 40 | 14 |
|  |  | Compressed | 5 | 4 | 1.4 |
| IV | .5 microns | Relaxed, Dry | 15 | 7 | .7 |
|  |  | Relaxed, Prewet | 25 | 110 | 11 |
|  |  | Compressed | 10 | 20 | 2 |

Notes:
Example II sample showed the same permeability at 10 psig with and without prewetting. (Water intrusion pressure was 3 psig).
Example IV first showed penetration for dry sample at 12 psig.
"Compressed" refers to samples held at near full compression.
Flux values were normalized to 10 psig assuming Flow and Pressure.

EXAMPLE V

Asymmetric Porous PTFE/PFA Alloy Tube

Figure 7:
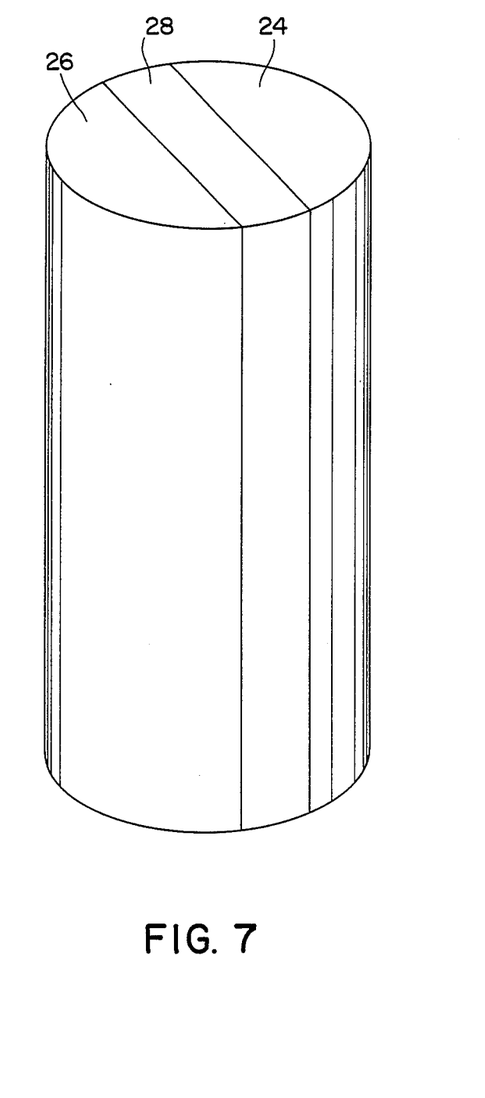
FIG. 7 is a perspective view of a tubular extrusion billet formed during fabrication of an asymmetric porous fluoropolymer alloy film in accordance with the present invention.
Figure 8:
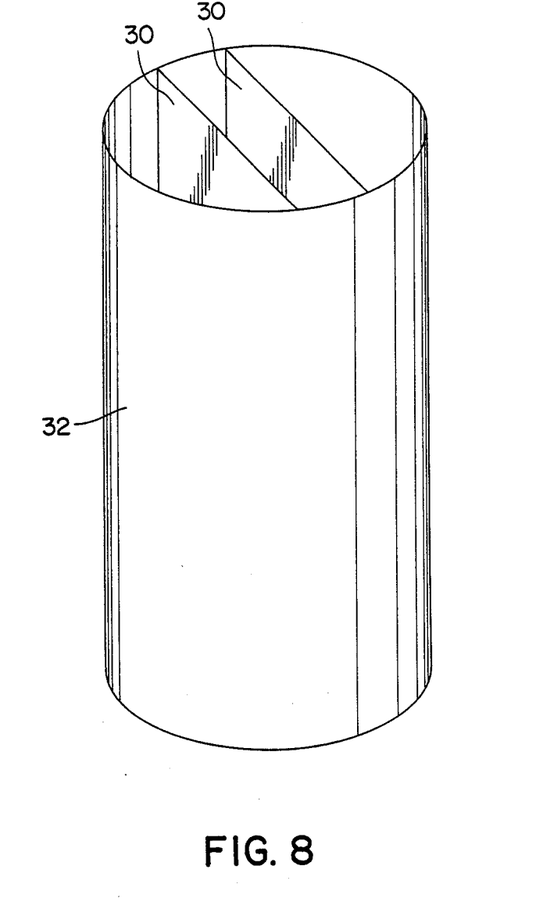
FIG. 8 is a perspective view of a pouring fixture that can be used during fabrication of an asymmetric porous fluoropolymer alloy film in accordance with the present invention.

An asymmetric porous fluoropolymer alloy material can also be produced by alloying, in accordance with the present invention, other fluoropolYmers capable of being stretched after extrusion, such as FEP and PFA. For example, an asymmetric porous PTFE/PFA alloy tube can be fabricated in accordance with the present invention by blending CD123 PTFE resin with 18% naphtha by weight in a one gallon jar and rolling the jar to ensure the naphtha mixes well with the resin; blending CD123 PTFE resin with 20% naphtha by weight in a second one gallon jar and rolling the jar to ensure the naphtha mixes well with the resin; blending a 50:50 mixture by weight of PFA and the 20% naphtha/CD123 lubricated resin blend in a third one gallon jar and rolling the jar to ensure the mixture is well blended; using a fixture similar to the fixture of FIG. 2 to pour the three blends into a preforming cylinder in concentric layers and compressing the layers at 400 psi to form an extrusion billet similar to billet 12 of FIG. 1, 8 wherein inner layer 10 is very thin and comprised of the 18% naphtha/CD123 lubricated resin blend, intermediate layer 16 is comprised of the 50:50 PFA/naphtha/CD123 lubricated resin blend and outer layer 14 is comprised of the 20% naphtha/CD123 lubricated resin blend (the purpose of the very thin 18% naphtha/CD123 lubricated resin blend inner layer is merely to prevent the 50:50 PFA/naphtha/CD123 lubricated resin blend intermediate layer from sticking to the core pin during extrusion); extruding the extrusion billet under a pressure of 2200 psi in a tubular ram extruder having a reduction ratio of 442:1 to form a tubular extrudate; cutting the extrudate into two-inch samples; heating the samples to a temperature below the crystalline melt point of the samples; stretching the samples at an expansion ratio of 4:1 at a rate of 10% per second to a length of eight inches; heating the samples to a temperature above the crystalline melt point of the samples for 10 to 15 minutes to sinter them; and allowing the samples to air cool to room temperature.

film can be produced by any of the procedures of Examples II, III, IV and V by forming the extrusion billet in layers as shown in FIG. 6. First layer 24 would be comprised of a fluoropolymer resin capable of being highly stretched after extrusion. Second layer 26 would be comprised of a fluoropolymer resin less capable of being stretched after extrusion. Intermediate layer 28, comprised of a mixture of the resins of the first and second layers, can be disposed between the first and second layers to assist mechanical bonding of the first and second layers. The pouring fixture of FIG. 7 can be used to separate the layers during pouring. Separating walls 30 affixed to fixture cylinder 32 separate the layers during pouring. Fixture cylinder 32 supports separating walls 30 in the preforming cylinder during pouring. After extrusion, the extrudate would be calendered between rollers into a film. The film would then be stretched and sintered as taught above.

Figure 9:
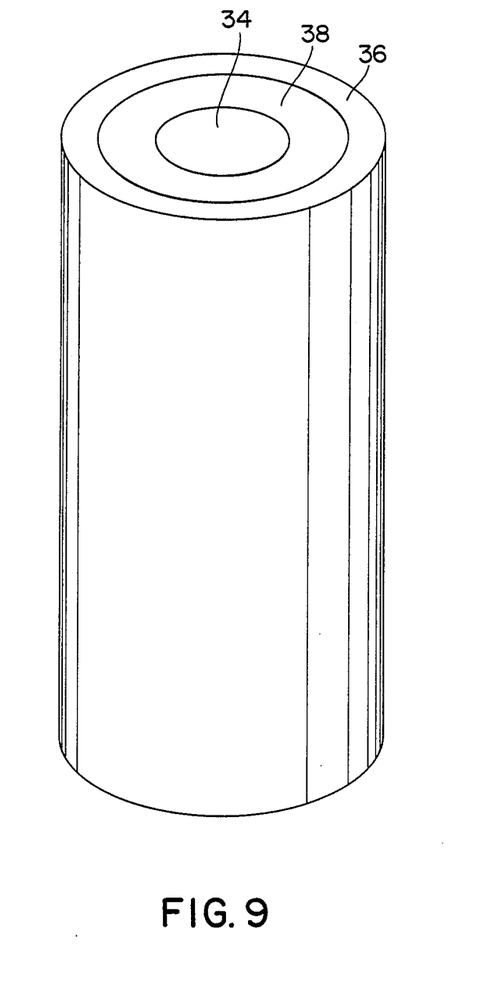
FIG. 9 is a perspective view of another tubular extrusion billet formed during fabrication of an asymmetric porous fluoropolymer alloy film in accordance with the present invention.

An asymmetric fluoropolymer alloy film can also be produced as immediately taught above by forming the extrusion billet in concentric layers as shown in FIG. 9. Because a core pin is not used in the extruder, the billet is solid. Core layer 34 would be comprised of a fluoropolymer resin capable of being highly stretched after extrusion. Outside concentric layer 36 would be comprised of a fluoropolymer resin less capable of being stretched after extrusion. Intermediate layer 38, comprised of a mixture of the resins of the first and second layers, can be disposed between the core and outside concentric layers to assist mechanical bonding of the core and outside concentric layers to assist mechanical bonding of the core and outside concentric layers. A pouring fixture similar to the pouring fixture of FIG. 2 can be used to separate the layers during pouring. After extrusion, the extrudate would be calendered, stretched and sintered as immediately taught above.

Therefore, the scope of the present invention is only limited by the following claims.

What is claimed is:

1. A porous fluoropolymer alloy material, comprising:
   a first fluoropolymer resin capable of being highly stretched after extrusion;

at least one second fluoropolymer resin capable of being stretched to a lesser degree than said first fluoropolymer resin;

wherein said first and second fluoropolymer resins are mechanically bonded to form an alloy; and wherein the material has a microstructure comprising nodes and interconnected by fibrils.

2. The porous fluoropolymer alloy material of claim 1, wherein said fluoropolymer resins are polytetrafluoroethylene resins.

3. The porous fluoropolymer alloy material of claim 1, wherein said first fluoropolymer resin is a polytetrafluoroethylene resin and at least one second fluoropolymer resin is a perfluoroalkoxytetrafluoroethylene resin.

4. An asymmetric porous fluoropolymer alloy material, comprising:

a first layer of a fluoropolymer resin capable of being highly stretched after extrusion;

a second layer of at least one second fluoropolymer resin capable of being stretched to a lesser degree than said resin of said first layer;

wherein said first and second layers are mechanically bonded to form an alloy; and wherein the material has a microstructure comprising nodes interconnected by fibrils, and wherein the size and length of the fibrils change through the cross-section of the material from one surface of the material to the opposite surface of the material.

5. The asymmetric porous fluoropolymer alloy material of claim 4, wherein said fluoropolymer resins are polytetrafluoroethylene resins.

6. The asymmetric porous fluoropolymer alloy material of claim 4, wherein said resin of said first layer is a polytetrafluoroethylene resin and at least one resin of said second layer is a perfluoroalkoxytetrafluoroethylene resin.

7. The asymmetric porous fluoropolymer alloy material of claim 4 further comprising:

a third layer, disposed between said first and second layers, of a mixture of said resins of said first and second layer; and wherein said first, second and third layers are mechanically bonded to form an alloy.

8. The asymmetric porous fluoropolymer alloy material of claim 7, wherein said fluoropolymer resins are polytetrafluoroethylene resins.

9. A porous fluoropolymer alloy material having a microstructure comprising nodes interconnected by fibrils, manufactured from a process comprising the steps of:

forming an extrusion billet comprising a first fluoropolymer resin capable of being highly stretched after extrusion and at least one second fluoropolymer resin capable of being stretched to a lesser degree than said first fluoropolymer resin;

extruding said extrusion billet to form an extrudate;

stretching said extrudate at a temperature below the crystalline melting point of said extrudate; and sintering said stretched extrudate by heating said stretched extrudate to a temperature above the crystalline melting point of said extrudate.

10. The porous fluoropolymer alloy material of claim 9, wherein said fluoropolymer resins are polytetrafluoroethylene resins.

11. The porous fluoropolymer alloy material of claim 9, wherein said first fluoropolymer resin is a polytetrafluoroethylene resin and at least one second fluoropolymer resin is a perfluoroalkoxytetrafluoroethylene resin.

12. An asymmetric porous fluoropolymer alloy material having a microstructure comprising nodes interconnected by fibrils and wherein the size and length of the fibrils change through the cross-section of the material from one surface of the material to the opposite surface of the material, manufactured from a process comprising the steps of:

forming an extrusion billet comprising a first layer of a fluoropolymer resin capable of being highly stretched after extrusion and a second layer of at least one second fluoropolymer resin capable of being stretched to a lesser degree than said resin of said first layer;

extruding said extrusion billet to form an extrudate;

stretching said extrudate at a temperature below the crystalline melting point of said extrudate; and sintering said extrudate by heating said at a temperature above the crystalline melting point of said extrudate.

13. The asymmetric porous fluoropolymer alloy material of claim 12, wherein said fluoropolymer resins are polytetrafluoroethylene resins.

14. The asymmetric porous fluoropolymer alloy material of claim 12, wherein said resin of said first layer is a polytetrafluoroethylene resin and at least one resin of said second layer is a perfluoroalkoxytetrafluoroethylene resin.

15. An asymmetric porous fluoropolymer alloy material having a microstructure comprising nodes interconnected by fibrils and wherein the size and length of the fibrils change through the cross-section of the material from one surface of the material to the opposite surface of the material, manufactured from a process comprising the steps of:

forming an extrusion billet comprising a first layer of a fluoropolymer resin capable of being highly stretched after extrusion, a second layer of a fluoropolymer resin capable of being stretched to a lesser degree than said resin of said first layer, and a third layer, disposed between said first and second layers, of a mixture of said resins of said first and second layers;

extruding said extrusion billet to form an extrudate;

stretching said extrudate at a temperature below the crystalline melting point of said extrudate; and sintering said stretched extrudate by heating said stretched extrudate to a temperature above the crystalline melting point of said extrudate.

16. The asymmetric porous fluoropolymer alloy material of claim 15, wherein said fluoropolymer resins are polytetrafluoroethylene resins.

17. A method of manufacturing a porous fluoropolymer alloy material having a microstructure comprising nodes interconnected by fibrils, comprising the steps of:

forming an extrusion billet comprising a first fluoropolymer resin capable of being highly stretched after extrusion and at least one second fluoropolymer resin capable of being stretched to a lesser degree than said first fluorocarbon resin;

extruding said extrusion billet to form an extrudate;

stretching said extrudate at a temperature below the crystalline melting point of said extrudate; and sintering said stretched extrudate by heating said stretched extrudate to a temperature above the crystalline melting point of said extrudate.

18. The method of claim 17, wherein said fluoropolymer resins are polytetrafluoroethylene resins.

19. The method of claim 17, wherein said first fluoropolymer resin is a polytetrafluorethylene resin and at least one second fluoropolymer resin is a perfluoroalkoxytetrafluorethylene resin.

20. A method of manufacturing an asymmetric porous fluoropolymer alloy material having a microstructure comprising nodes interconnected by fibrils and wherein the size and length of the fibrils change through the cross-section of the material from one surface of the material to the opposite surface of the material, comprising the steps of:

forming an extrusion billet comprising a first layer of a fluoropolymer resin capable of being highly stretched after extrusion and a second layer of at least one second fluoropolymer resin capable of being stretched to a lesser degree than said resin of said first layer;

extruding said extrusion billet to form an extrudate;

stretching said extrudate at a temperature below the crystalline melting point of said extrudate; and sintering said stretched extrudate by heating said stretched extrudate to a temperature above the crystalline melting point of said extrudate.

21. The method of claim 20, wherein said fluoropolymer resins are polytetrafluoroethylene resins.

22. The method of claim 20 wherein said resin of said first layer is a polytetrafluoroethylene resin and at least one resin of said second layer is a perfluoroalkoxytetrafluoroethelyne resin.

23. A method of manufacturing an asymmetric porous fluoropolymer alloy material having a microstructure comprising nodes interconnected by fibrils and wherein the size and length of the fibrils change through the cross-section of the material from one surface of the material to the opposite surface of the material, comprising the steps of:

forming an extrusion billet comprising a first layer of a fluoropolymer resin capable of being highly stretched after extrusion, a second layer of a fluoropolymer resin capable of being stretched to a lesser degree than said resin of said first layer, and a third layer, disposed between the said first and second layers, of a mixture of said resins of said first and second layers;

extruding said extrusion billet to form an extrudate;

stretching said extrudate at a temperature below the crystalline melting point of said extrudate; and sintering said stretched extrudate by heating said stretched extrudate to a temperature above the crystalline melting point of said extrudate.

24. The method of claim 23, wherein said fluoropolymer resins are polytetrafluoroethylene resins.

* * * * *

UNITED STATES PATENT AND TRADEMARK OFFICE
CERTIFICATE OF CORRECTION

PATENT NO. : 4,973,609

DATED : November 27, 1990

INVENTOR(S) : Ronnie Browne

It is certified that error appears in the above-identified patent and that said Letters Patent is hereby corrected as shown below:

Column 3, line 26, "fluoropolYmer" should read --fluoropolymer--.

Column 11, line 32, "fluoropolYmers" should read --fluoropolymers--.

Column 11, line 49, "8 wherein" should read --wherein--.

Signed and Sealed this

Twenty-seventh Day of October, 1992

Attest:

DOUGLAS B. COMER

Attesting Officer        Acting Commissioner of Patents and Trademarks